March 17, 1959
W. V. HENRY
2,877,475
SEPARATING POTATOES
Filed Nov. 1, 1954
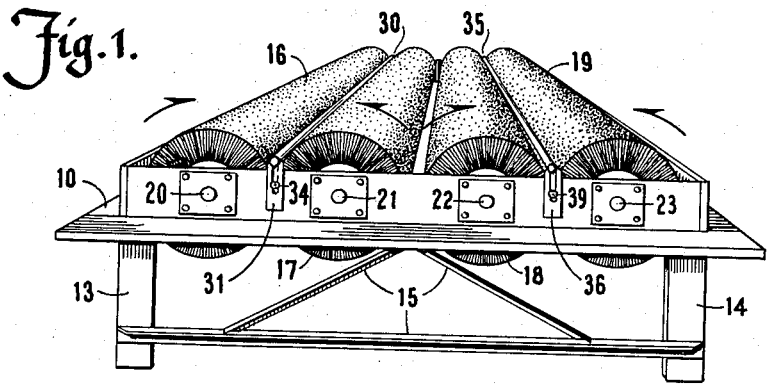
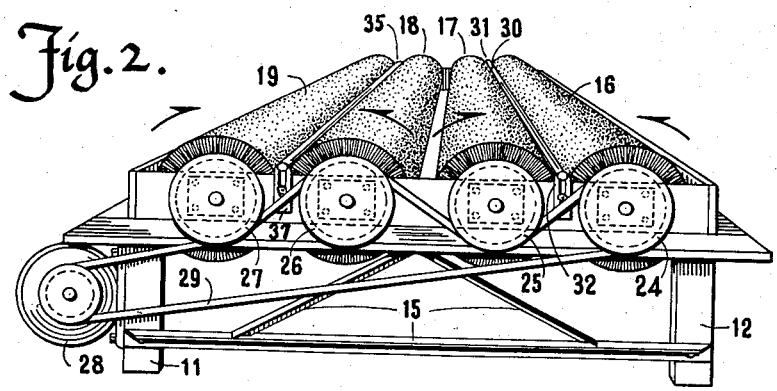
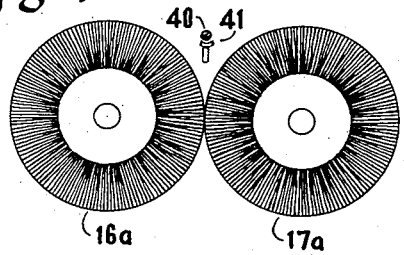
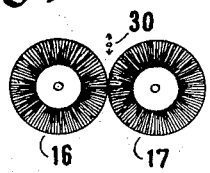
William V. Henry
INVENTOR.
BY Mel R. Poston
ATTORNEY

United States Patent Office 2,877,475
Patented Mar. 17, 1959

2,877,475

SEPARATING POTATOES

William V. Henry, Candler, N. C.

Application November 1, 1954, Serial No. 465,809

3 Claims. (Cl. 15—3.11)

This invention relates to the art of harvesting vegetables and more particularly to an improved apparatus for separating potatoes from clods of earth dug up with the potatoes.

It is well known that when potatoes are dug up from their growing place they are not ready for marketing. The potatoes are mixed with clods of earth or dirt and many of the potatoes have large amounts of earth or other foreign matter adhering to the skin of the potatoes. These clods must be removed and separated before the potatoes can be sold.

Heretofore, various schemes have been employed for separating potatoes from accompanying clods and dirt. However, so far as is known, none of the previous methods has been entirely satisfactory in operation, while at the same time providing a relatively inexpensive and trouble-free manner of accomplishing the desired result. As a result, many operations today employ manual labor for separating potatoes from clods. In a typical operation, the potatoes are dug out of the ground by a suitable digging machine after which a so-called bulk loader passes over the field causing potatoes and clods of earth alike to be taken up on the moving conveyor portion of the bulk loader. This conveyor is capable of effecting only a very crude separation of clods and potatoes. Therefore, the general practice is to manually separate the potatoes and clods that are collected by the bulk loader.

It is an object of this invention to provide an improved apparatus for separating potatoes from clods of earth.

Another object is to provide an inexpensive, easy to maintain, apparatus for very rapidly separating adhering dirt from potatoes.

A still further object is to provide an apparatus which can be used to separate small undesired potatoes from larger ones, while at the same time separating clods of earth from the latter and cleaning them.

Other objects will be apparent from the following description taken in conjunction with the annexed drawings, wherein:

Figure 1 is a perspective view of a machine comprising two units constructed in accordance with the invention;

Figure 2 is another perspective view taken from the opposite end of the machine shown in Figure 1;

Figure 3 is a diagrammatic view showing the relation between the cleaning brushes and potato supporting element of the present invention; and Figure 4 is a diagrammatic view showing certain details of another embodiment of the present invention.

In a preferred embodiment, the present invention contemplates separating potatoes from clods by placing them in contact with a supporting member disposed equidistant between two driven cylindrical brushes which are rotating so their surfaces tend to converge, as seen from above, and causing them to move longitudinally along the brushes. The potatoes rest on the surface of the supporting member and the surface of one of the brushes as they pass along the length of the brushes. Clods and other foreign materials are removed from the potatoes and carried downwardly between the rotating brushes. Movement of the potatoes along the brushes is accomplished by gravity or optionally by providing a conveyor device as the potato supporting member.

Referring now to the drawings, there is shown a rectangular metal frame generally indicated with the reference numeral 10. Frame 10 is attached to and supported by legs 11, 12, 13, 14 disposed at its corners. Suitable bracing members 15 lend strength and stability to the frame and legs. Mounted within frame 10 are two pairs of rotatable cylindrical brushes 16, 17 and 18, 19. The surface of each member of each pair of brushes is substantially in contact with the surface of the other member.

As seen in Figure 1, one end of the shaft of each of the brushes 16–19 (inclusive) is supported by a self aligning flange type bearing 20, 21, 22, 23, respectively. Bearings 20–23 are mounted in frame 10 by any appropriate means. At the opposite end (Figure 2) the shafts of brushes 16–19 are supported in bearings carried by frame 10. At this end, the shaft of each of the brushes 16–19 extends beyond frame 10 and has attached thereto a grooved pulley 24, 25, 26, 27, respectively. A motor 28 mounted on leg 11 is provided for driving an endless belt 29 which in turn rotates the pulleys 24–27 and the brushes 16–19. The motor is capable of operating the brushes at a speed of about 150 R. P. M.

It will be understood from the driving arrangement shown in Figure 2 that when motor 28 rotates in a counterclockwise direction, the pair of brushes 16, 17 are driven in opposite directions so that the surfaces of the brushes tend to converge, as viewed from above. Under these conditions, each of the brushes 18, 19 likewise rotate in opposite directions, their surfaces tending to converge as viewed from above.

A potato supporting member or bar 30 extends throughout the length of the brushes 16, 17. Bar 30 is disposed in spaced relation to and equidistant from brushes 16, 17. At each end of bar 30 there is attached a slotted extension 31, 32. The distance between bar 30 and the surfaces of brushes 16, 17 may be adjusted by means of nuts, such as nut 34 shown in Figure 1, and stud bolts connected to frame 10. A second potato supporting member or bar 35 is disposed between brushes 18, 19 and provided with slotted extensions 36, 37. Nuts, such as nut 39 in Figure 1, similarly make possible the adjustment of bar 35 with respect to brushes 18, 19.

Figure 3 is a diagrammatic view taken through brushes 16, 17 and bar 30 and showing the relation between these parts. It will be evident from this figure that the weight of a potato placed on the device will be distributed between the bar 30 and one of the brushes 16, 17. Bar 30 will at all times be spaced a sufficient distance from the brushes so potatoes of an undesired size will be able to pass between the bar and one of the brushes and dispelled out the bottom of the device along with the clods of earth, dirt and other foreign material. Thus, the present invention provides a way of sorting potatoes as well as separating them from clods of earth and cleaning them.

Although the device just described may be used at any suitable location, it is preferred that it be transported into the field where the potatoes are grown and used there to separate the potatoes from clods dug up along with the potatoes. More particularly it is contemplated, according to the present invention, to utilize the above device in combination with a bulk loader or similar mechanism. In this application of the invention, the frame 10 and related structure may readily be incorporated into the bulk loader mechanism as a part thereof and the potatoes and clods of earth automatically fed onto one end of the brushes of the present apparatus by the bulk loader as it progresses through the field. In this manner, clods of earth and small, undesired potatoes are returned directly to the ground out through the bottom of the apparatus and only marketable potatoes are taken from the field. The potatoes issuing from the opposite end of the brushes, completely separated from clods, are collected in any suitable manner.

Figure 4 illustrates a section view taken through the brushes and potato supporting member of another embodiment of the invention wherein the supporting member comprises a continuous moving belt 40. Belt 40, which may be of rubber or other resilient material, bears the same relation to brushes 16a, 17a, that bar 30 does to brushes 16, 17. To prevent extreme sagging of belt 40, a metal trough-like guard member 41 is disposed underneath the belt as it passes between brushes 16, 17. Guard member 41 is supported from the frame of the apparatus by any suitable means (not shown). Endless belt 40 may be driven by any appropriate arrangement such as by a grooved pulley disposed at one end of the apparatus framework and driven by one of the brush pulleys through a bevel gear arrangement.

While the use of a movable potato supporting member, as shown in Figure 4, is satisfactory, it is in no way essential. Very satisfactory results are obtained and a steady flow of potatoes through the apparatus is effected if an apparatus with a stationary supporting bar, as shown in Figures 1–3, is tilted slightly to promote the feeding of the potatoes along the brushes.

The brushes used in practicing the present invention should have stiff bristles. Eminently satisfactory results have been obtained with so-called spiral brushes having a hollow metal core 4 inches in diameter and having 2 inch bristles of Tampico fiber, the overall diameter of the brushes being 8 inches. The brushes were mounted side-by-side with the bristles being substantially in contact. These brushes were 24 inches long and were rotated 150 R. P. M. The stationary supporting bar used was an iron metal cylindrical rod 5/16 inch in diameter and was spaced equidistant from the brushes and 1 inch above a line passing through the brushes' axes. By tilting this assembly about 10 degrees with respect to the horizon, a steady feed of potatoes through the machines is effected and the potatoes removed from the machine are completely free from clods, clean, and ready for marketing.

Separation of the clods from the potatoes by the present invention is due primarily to the difference in the surface characteristics of the two objects. Since the potatoes have a relatively hard, smooth surface which cannot be penetrated by the bristles of the brushes, they are substantially unaffected by the brushes. The clods, being relatively porous and soft, tend to be disintegrated by the bristles or lodged in between the bristles and are caused to pass downwardly and be ejected below.

While a preferred embodiment of the invention has been shown and described, various changes and modifications may be made without departing from the spirit of the invention as defined in the appended claims.

What is claimed is:

1. Apparatus for separating potatoes from clods comprising in combination a first generally horizontally disposed cylindrical brush, a second cylindrical brush disposed parallel to said first brush in side-by-side relation thereto, the bristles of said brushes being substantially in contact along a plane in which the axes of the brushes lie, means to rotate said brushes in opposite directions so the surfaces of said brushes tend to converge when viewed from above, and a potato supporting member disposed parallel to and equidistant from each of said brushes, the potato supporting surface of said supporting member being disposed out of contact with the bristles of said brushes and in a plane above the plane in which the axes of said brushes lie.

2. Apparatus for separating potatoes from clods comprising in combination a first generally horizontally disposed cylindrical brush, a second cylindrical brush disposed parallel to said first brush in side-by-side relation thereto, the bristles of said brushes being substantially in contact along a plane in which the axes of the brushes lie, means to rotate said brushes in opposite directions so the surfaces of said brushes tend to converge when viewed from above, and a cylindrical potato supporting bar coextensive with and equally spaced from each of said brushes, said bar being disposed a substantial distance away from the bristles of said brushes and in a plane above the plane in which the axes of said brushes lie.

3. Apparatus for separating potatoes from clods comprising in combination a first cylindrical brush, a second cylindrical brush having substantially the same diameter as said first brush and being disposed parallel to said first brush in side-by-side relation thereto, the bristles of said brushes being substantially in contact along a plane in which the axes of the brushes lie, means to rotate said brushes in opposite directions so the surfaces of said brushes tend to converge when viewed from above, a potato conveyor coextensive with and equally spaced from each of said brushes, the potato contacting surface of said conveyor being disposed a substantial distance away from the bristles of said brushes and in a plane above the plane in which the axes of said brushes lie, and means to cause said conveyor to move axially throughout the length of said brushes.

References Cited in the file of this patent

UNITED STATES PATENTS

| | | |
|---|---|---|
| 842,378 | Baker | Jan. 29, 1907 |
| 988,529 | Woolslair et al. | Apr. 4, 1911 |
| 1,657,126 | Kasser | Jan. 24, 1928 |
| 1,844,264 | Skinner | Feb. 9, 1932 |
| 1,927,721 | Stevens et al. | Sept. 19, 1933 |
| 2,102,758 | Spayd | Dec. 21, 1937 |
| 2,234,766 | Kennedy et al. | Mar. 11, 1941 |
| 2,538,331 | Ruzsicska | Jan. 16, 1951 |
| 2,627,140 | Marzolf | Feb. 3, 1953 |
| 2,690,576 | Dreesman | Oct. 5, 1954 |